(12) United States Patent
Chen

(10) Patent No.: US 9,593,993 B1
(45) Date of Patent: Mar. 14, 2017

(54) VEHICLE-MOUNTED DETECTING DEVICE FOR A BICYCLE

(71) Applicant: WELLGO PEDAL'S CORP., Taichung (TW)

(72) Inventor: Chung-I Chen, Taichung (TW)

(73) Assignee: WELLGO PEDAL'S CORP., Taichung (TW)

( * ) Notice: Subject to any disclaimer, the term of this patent is extended or adjusted under 35 U.S.C. 154(b) by 0 days.

(21) Appl. No.: 14/836,964

(22) Filed: Aug. 27, 2015

(51) Int. Cl.
*G01L 5/22* (2006.01)
*H04Q 9/00* (2006.01)
*A63B 24/00* (2006.01)

(52) U.S. Cl.
CPC .......... *G01L 5/225* (2013.01); *A63B 24/0062* (2013.01); *H04Q 9/00* (2013.01); *H04Q 2209/50* (2013.01)

(58) Field of Classification Search
None
See application file for complete search history.

(56) References Cited

U.S. PATENT DOCUMENTS

| | | | | |
|---|---|---|---|---|
| 6,227,071 B1* | 5/2001 | Coombe | .................. | B62M 3/08 384/454 |
| 6,644,135 B1* | 11/2003 | Kishimoto | ............... | B62M 6/45 73/862.338 |
| 6,694,845 B2* | 2/2004 | Campagnolo | ............ | B62M 3/08 324/174 |
| 7,418,862 B2* | 9/2008 | Gruben | .................... | B62M 3/08 482/8 |
| 7,526,982 B2* | 5/2009 | Chen | ....................... | B62M 3/086 74/594.4 |
| 7,806,006 B2* | 10/2010 | Phillips | ................. | G01L 3/1457 280/259 |
| 8,001,836 B2* | 8/2011 | Isono | ....................... | B60T 7/042 73/132 |
| 8,011,242 B2* | 9/2011 | O'Neill | .................... | G01L 3/242 73/379.01 |
| 8,316,709 B2* | 11/2012 | Grab | .................. | A63B 22/0605 73/379.01 |
| 8,327,723 B2* | 12/2012 | Roudergues | ............ | G01L 5/225 73/760 |
| 8,387,470 B2* | 3/2013 | Tuulari | ................. | G01L 1/2237 73/862.627 |
| 8,408,094 B2* | 4/2013 | Chen | ........................ | B62M 3/08 74/594.1 |
| 8,464,608 B2* | 6/2013 | Chen | ...................... | B62M 3/086 267/151 |
| 8,584,520 B2* | 11/2013 | Kokkoneva | ............ | G01D 11/24 73/379.01 |

(Continued)

*Primary Examiner* — Lisa Caputo
*Assistant Examiner* — Tran M Tran
(74) *Attorney, Agent, or Firm* — Guice Patents PLLC

(57) ABSTRACT

A vehicle-mounted detecting device for a bicycle comprises a force sensing base, a strain touch member for detecting the direction and magnitude of force, and a sensor contacted with the sensor. The detecting device is assembled to a crank and a pedal shaft of the bicycle in a manner of external hanging. The detecting device may obtain a pedaling force detecting message. The message of the rotating speed and the tilted angle message may be obtained by a cadence sensor which is packaged in a ring housing. The messages are finally transmitted to a smart mobile device by a microprocessor which is mounted at a ring outer base.

8 Claims, 6 Drawing Sheets

(56) References Cited

U.S. PATENT DOCUMENTS

| | | | | |
|---|---|---|---|---|
| 8,584,529 B2* | 11/2013 | Fisher | ................... | B62M 3/00 |
| | | | | 73/760 |
| 8,661,938 B1* | 3/2014 | Chen | ................... | B62M 3/086 |
| | | | | 74/594.6 |
| 8,714,052 B2* | 5/2014 | Chamberlain | ........... | B62M 3/08 |
| | | | | 384/276 |
| 8,844,404 B2* | 9/2014 | Chen | ................... | B62M 3/08 |
| | | | | 74/594.4 |
| 8,961,191 B2* | 2/2015 | Hanshew | ............... | H01R 39/64 |
| | | | | 439/21 |
| 9,127,969 B2* | 9/2015 | Kokkoneva | ............ | G01D 11/24 |
| 9,150,278 B2* | 10/2015 | Lukatela | ................ | B62M 3/16 |
| 9,182,304 B2* | 11/2015 | Namiki | ................... | B62M 3/00 |
| 9,199,692 B2* | 12/2015 | Chen | ................... | B62M 3/08 |
| 9,327,800 B2* | 5/2016 | Chen | ................... | B62M 3/08 |
| 2002/0108466 A1* | 8/2002 | Campagnolo | ............ | B62M 3/08 |
| | | | | 74/594.4 |
| 2014/0001728 A1* | 1/2014 | Hilfiker | ................ | G01L 5/165 |
| | | | | 280/259 |

* cited by examiner

VEHICLE-MOUNTED DETECTING DEVICE FOR A BICYCLE

BACKGROUND OF THE INVENTION

1. Field of the Invention

The present invention relates to a vehicle-mounted detecting device for a bicycle, and especially relates to a detecting device capable for detecting the pedaling force and the pedaling frequency. The vehicle-mounted detecting device is assembled to the crank and the pedal in a manner of external hanging.

2. Description of Related Art

The key of activation, speed control, and energy development is how to efficiently pedal the pedal. The messages of the pedaling frequency and the pedaling force are extensively applied to any riding condition, pedaling skill, and even the analysis for frame design. The control of the pedaling frequency and the pedaling force is not only the training items for professional riders, but also popularizes for common riders.

The pedaling frequency and the pedaling force may be obtained by the force sensor and the speed sensor through the crank, the pedal frame, or the pedal shaft and wirelessly transmitted to the cycling computer or the smart mobile device to transfer to specific data for analyzing by software application. In the past, the force sensor and the speed sensor are integrated with the pedal frame of the pedal shaft. The advantage is that the sensors are firmly positioned and the messages of the pedaling force and the pedaling frequency are surely received. But the disadvantage is that the pedal must be made special for replacing and obtaining the messages of the pedaling force and the pedaling frequency so that the cost is increased and the replaced pedal needs to be accommodated by the rider. In addition, it is complicated for integrating the force sensor and the speed sensor with the pedal frame or the pedal shaft. It must modify the original design of the pedal frame or the pedal shaft. The following problem is whether the strength and the weight of the structure of the pedal are influenced negatively or not. It must be reassessed.

Besides, the force sensor and the speed sensor are coupled to the crank or the pedal in a manner of external hanging. The advantage thereof is that the pedal is not necessary to replace and capable for obtaining and receiving the messages. The disadvantage is that the position, method, and steadiness may influence the effectiveness of obtaining and receiving the messages actually.

In view of the foregoing circumstances, the inventor has invested a lot of time to study the relevant knowledge, compare the pros and cons, research and develop related products. After quite many experiments and tests, the "vehicle-mounted detecting device for a bicycle" of this invention is eventually launched to improve the foregoing shortcomings, to meet the public use.

SUMMARY OF THE INVENTION

An object of this invention is providing a vehicle-mounted detecting device for a bicycle for detecting the pedaling force and the pedaling frequency. The detecting device is assembled to the crank and the pedal shaft in a manner of external hanging.

In order to achieve above mentioned effects, a vehicle-mounted detecting device for a bicycle is provided. The vehicle-mounted detecting device may comprise a force sensing base, screwed with a screw hole of a pedal end of a crank of the bicycle through a threading structure, and an axle end of a pedal shaft of a pedal of the bicycle is pivoted at a center of the force sensing base by a bolt; a strain touch member, contacted with and fastened at an outside of the force sensing base through a ring housing and for detecting a forced direction and a forced magnitude of the force sensing base; a sensor, contacted with the strain touch member, the sensor is a ring structure, the sensor is contacted with and fastened at the outside of the strain touch member through the ring housing and a ring cover fastened at the force sensing base, and a pedaling force exerted from a rider of the bicycle is transmitted to the sensor through the pedal shaft, the force sensing base, and the strain touch member, and then a pedaling force detecting message is obtained by the sensor; and a ring outer base, connected to and fastened at between the ring housing and the ring cover and covered the sensor, the ring outer base is connected to a battery base and a control box, a battery is changeably installed in the battery base, a microprocessor assembly is arranged in the control box, the battery and the microprocessor are coupled with each other, and the pedaling force detecting message obtained by the sensor is received and processed by the microprocessor assembly and then transmitted to a smart mobile device.

The detecting device further comprises a cadence sensor which is packaged in the ring housing, a message of a rotating speed of the pedal of the bicycle exerted by the rider is obtained by the cadence sensor and received and processed by the microprocessor assembly, and then the message of the rotating speed is transmitted to the smart mobile device.

In some embodiments, the cadence sensor is a G-sensor, a tilted angle message of the bicycle is obtained by the G-sensor, and the tilted angle message is received and processed by the microprocessor assembly and then transmitted to the smart mobile device.

In some embodiments, the force sensing base includes a connection portion and a sensing portion coaxially integrated with each other, the connection portion is screwed with the screw structure, the sensing portion has an axial connection groove, the axle end of the pedal shaft is passing through the connection groove and connected with the bolt arranged at the axles of the connection portion and the sensing portion.

In some embodiments, the strain touch member includes a plurality of strain touch elements with plate and claw shape, one end of each strain touch element is connected to the ring housing, the strain touch elements are arranged parallel to the axle of the force sensing base, evenly spaced apart from each other, and contacted with a surface of the sensing portion.

In some embodiments, the other end of each strain touch element opposite to the ring housing is connected with a ring touch element, the ring touch element is installed in a ring groove arranged at the surface of the sensing portion.

In some embodiments, the ring housing is fastened to at least one slot of the sensing portion through at least one snap, and the ring cover is assembled on a reducing diameter step of the sensing portion adjacent to the connection portion.

In some embodiments, a surface of the ring housing faced to the ring cover and a surface of the ring cover faced to the ring housing are respectively formed an embedding groove, and two ends of the ring structure of the sensor are respectively embedded in the corresponding embedding groove.

In some embodiments, the ring outer base includes a half-ring upper base and a half-ring lower base, the upper base and the lower base are connected with each other.

In some embodiments, the upper base and the lower base are respectively having a cross portion and a facing portion, the cross portions of the upper base and the lower base are connected and fastened to each other by an axial bolt, and the facing portions of the upper base and the lower base are connected and fastened to each other by a lock screw.

In conclusion, the pedaling force pedaled by the rider through the pedal, the pedal shaft, the force sensing base, and the strain touch member is transmitted to the sensor so as to obtain the pedaling force detecting message. The message of the rotating speed is detected by the cadence sensor. The microprocessor assembly receives the pedaling force detecting message and the message of the rotating speed and transfers to digital information to transmit to the cycling computer or the smart mobile device and calculate to specific data by software application for analyzing.

Besides, a tilted angle message of the bicycle, such as tilting forward or backward while riding at descent or ascent, or tilting leftward or rightward while turning, may be obtained by the cadence sensor (G-sensor). The tilted angle message is received by the microprocessor and transmitted to the smart mobile device to transfer to specific data through software application, such as gradient or turning angle.

Furthermore, the pedaling force detecting message, the message of the rotating speed, and the tilted angle message are transferred to specific gradient relative to speed data and turning angle relative to speed data for analyzing by the smart mobile device.

The vehicle-mounted detecting device is assembled to the connection of the crank and the pedal in a manner of external hanging.

It is not necessary to change the structure of the pedal while mounting the detecting device.

The manner of external hanging is simple, easy to perform, and firmly positioned.

The vehicle-mounted detecting device may be realize at ant type of the crank and the pedal.

The design and arrangement of the strain touch elements and the ring touch element may make the direction and magnitude of the pedaling force to actually react on the strain touch elements. The sensor with ring structure may entirely receive the force which is transmitted from each strain touch element to improve sensitivity.

The various objectives and advantages of the present invention will be more readily understood from the following detailed description when read in conjunction with the appended drawing.

DETAILED DESCRIPTION OF THE INVENTION

To describe clearly that the present invention achieves the foregoing objective and function, the technical features and desired function are described with reference to a preferred embodiment and accompanying drawings.

Figure 1:
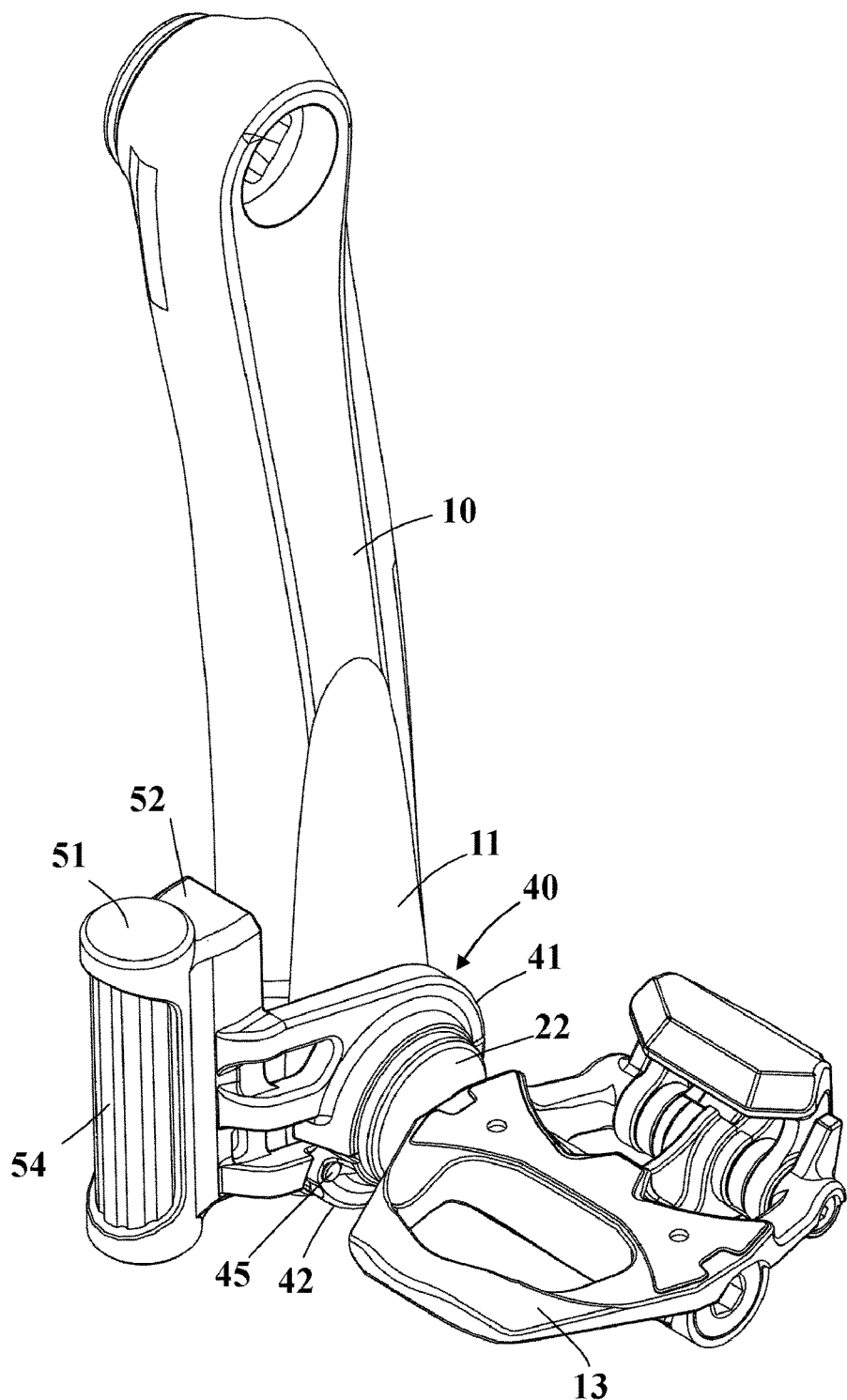
FIG. 1 is a perspective view of a vehicle-mounted detecting device for a bicycle of the present invention.
Figure 2:
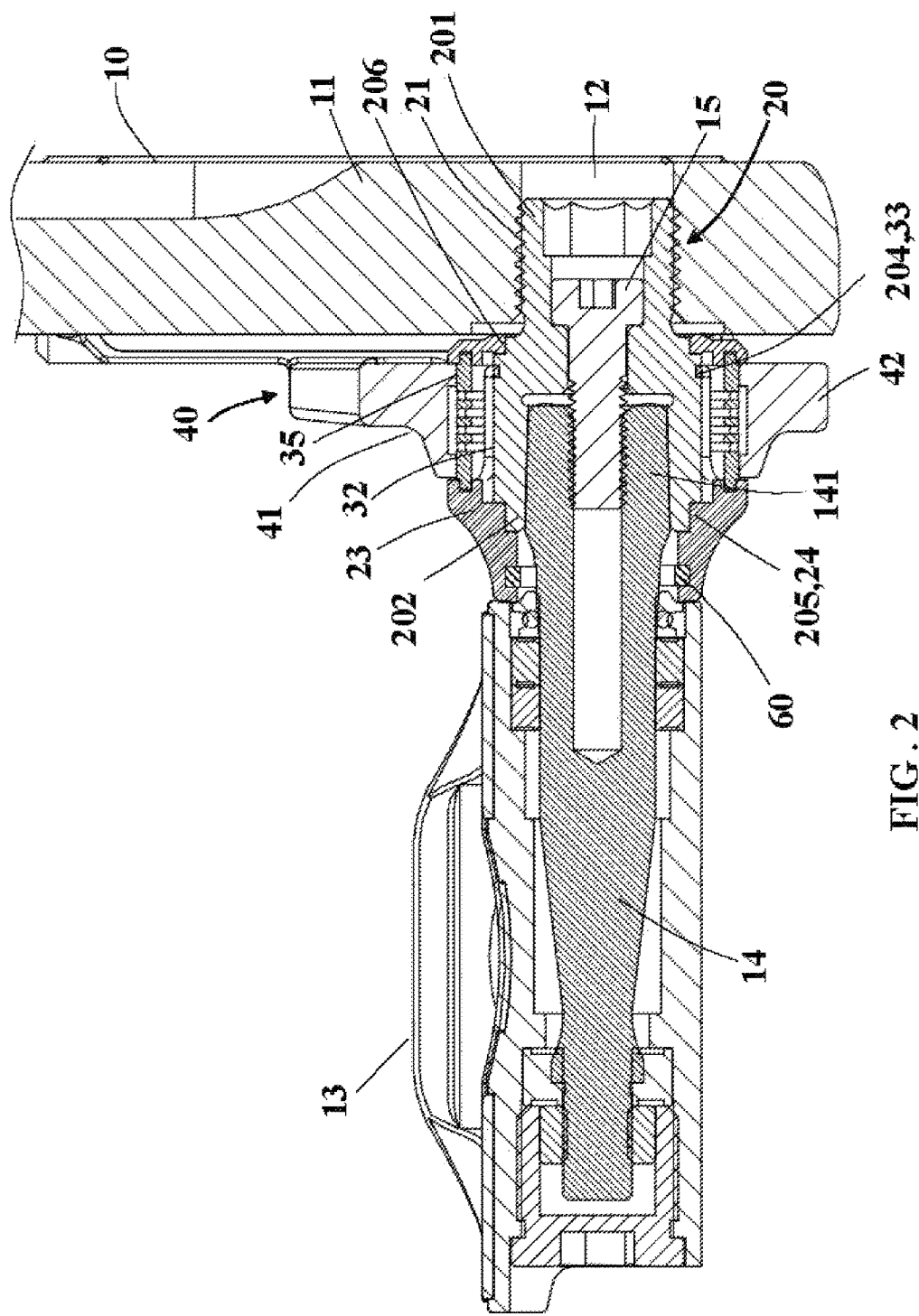
FIG. 2 is a cross-sectional view of the vehicle-mounted detecting device of the present invention.
Figure 3:
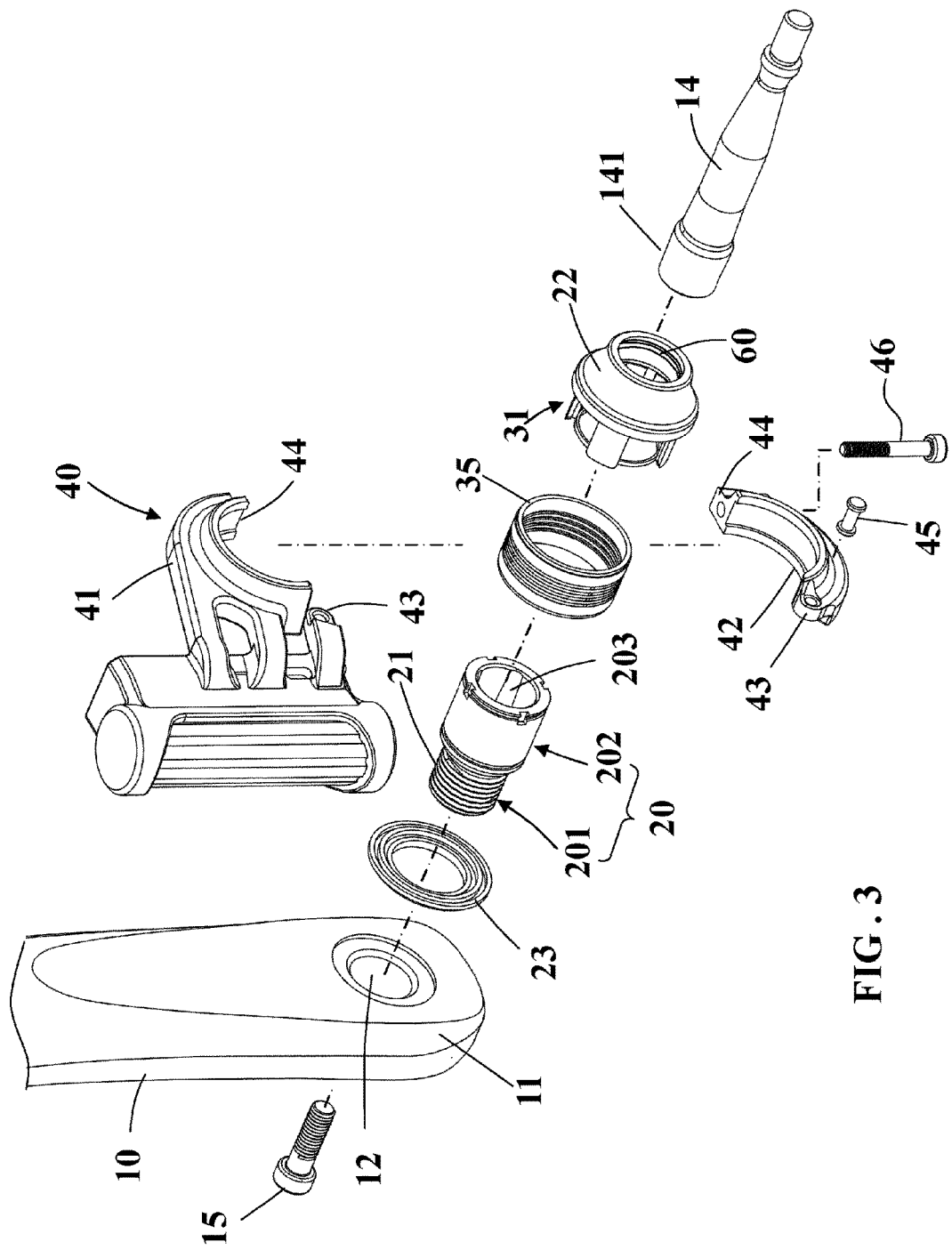
FIG. 3 is an exploded view of the vehicle-mounted detecting device of the present invention after removing the pedal.

Please refer to FIGS. 1 to 3. FIG. 1 is a perspective view of a vehicle-mounted detecting device for a bicycle of the present invention. FIG. 2 is a cross-sectional view of the vehicle-mounted detecting device of the present invention. FIG. 3 is an exploded view of the vehicle-mounted detecting device of the present invention. In FIG. 3, in order to show the detail of the vehicle-mounted detecting device of the present invention, the pedal and the relative elements assembled to the pedal shaft are not drawn. The pedal and the relative elements assembled to the pedal shaft are prior art and not the subject matter of the present invention.

The vehicle-mounted detecting device comprises a force sensing base 20, a strain touch member 31, a sensor 35, a ring outer base 40, and a cadence sensor 60. The force sensing base 20 may be screwed with a screw hole 12 of a pedal end 11 of a crank 10 of the bicycle through a threading structure 21. An axle end of a pedal shaft 14 of a pedal 13 the bicycle is pivoted at a center of the force sensing base 20 by a bolt 15.

The strain touch member 31 may be contacted with and fastened at an outside of the force sensing base 20 through a ring housing 22 and for detecting a forced direction and a forced magnitude of the force sensing base 20. The strain touch member 31 may include a plurality of strain touch elements 32. One end of each strain touch element 32 is connected to the ring housing 22. The strain touch elements 32 are arranged and contacted with an outer surface of the force sensing base 20.

The sensor 35 may be contacted with the strain touch member 31. The sensor 35 is contacted with and fastened at the outside of the strain touch member 31 through the ring housing 22 and a ring cover 23 fastened at the force sensing base 20. The sensor 35 is for detecting the force and signal and packaged with electronic elements and circuit to form a ring structure so that each strain touch element 32 arranged on the force sensing base 20 may be sufficiently contacted therewith to receive the force transmitted from each strain touch element 32. A directing force is generated from the pedal shaft 14 while pedaling the pedal 13 and transmitted to the force sensing base 20 through the pedal shaft 14 so that a strain force is generated from the force sensing base 20 by the directing force. The strain force is transmitted to the strain touch elements 32 and a pressure is generated from the strain touch elements 32. The pressure is minute, but the pressure may be transmitted to the sensor 35 so that a pedaling force detecting message is obtained by the sensor 35. The pedaling force detecting message includes the magnitude and direction of force.

The ring outer base 40 may be connected to and fastened at between the ring housing 22 and the ring cover 23 and covered the sensor 35. The ring outer base 40 may be connected to a battery base 51 and a control box 52. A battery 53 may be changeably installed in the battery base 51. The battery 53 may be protected by a battery cylinder 54. A microprocessor assembly 55 may be arranged in the control box 52. The battery 53 and the microprocessor assembly 55 are coupled with each other. And the pedaling force detecting message obtained by the sensor 35 is received and processed (transferred to digital information) by the microprocessor assembly 55 and then transmitted to a cycling computer or a smart mobile device. The battery 53 provides power to the microprocessor 55.

A cadence sensor 60 may be packaged in the force sensing base 220, the ring housing 22, the ring cover 23, the sensor 35, the ring outer base 40, or the microprocessor assembly 45. In this embodiment, the cadence sensor 60 is packaged in the ring housing 22. The cadence sensor 60 may be a G-sensor. A message of a rotating speed of the pedal 13 of the bicycle exerted by the rider is obtained by the cadence sensor 60 and received and processed (transferred to digital information) by the microprocessor assembly 55, and then the message of the rotating speed is transmitted to the cycling computer or the smart mobile device.

The pedaling force detecting message and the message of the rotating speed are transferred and calculated to specific data by software application in the cycling computer or the smart mobile device and further used for analyzing.

Besides, a tilted angle message of the bicycle, such as tilting forward or backward while riding at descent or ascent, or tilting leftward or rightward while turning, may be obtained by the cadence sensor 60 (G-sensor). The tilted angle message is received by the microprocessor 55 and transmitted to the smart mobile device to transfer to specific data through software application, such as gradient or turning angle.

Furthermore, the pedaling force detecting message, the message of the rotating speed, and the tilted angle message are transferred to specific gradient relative to speed data and turning angle relative to speed data for analyzing by the smart mobile device.

Figure 4:
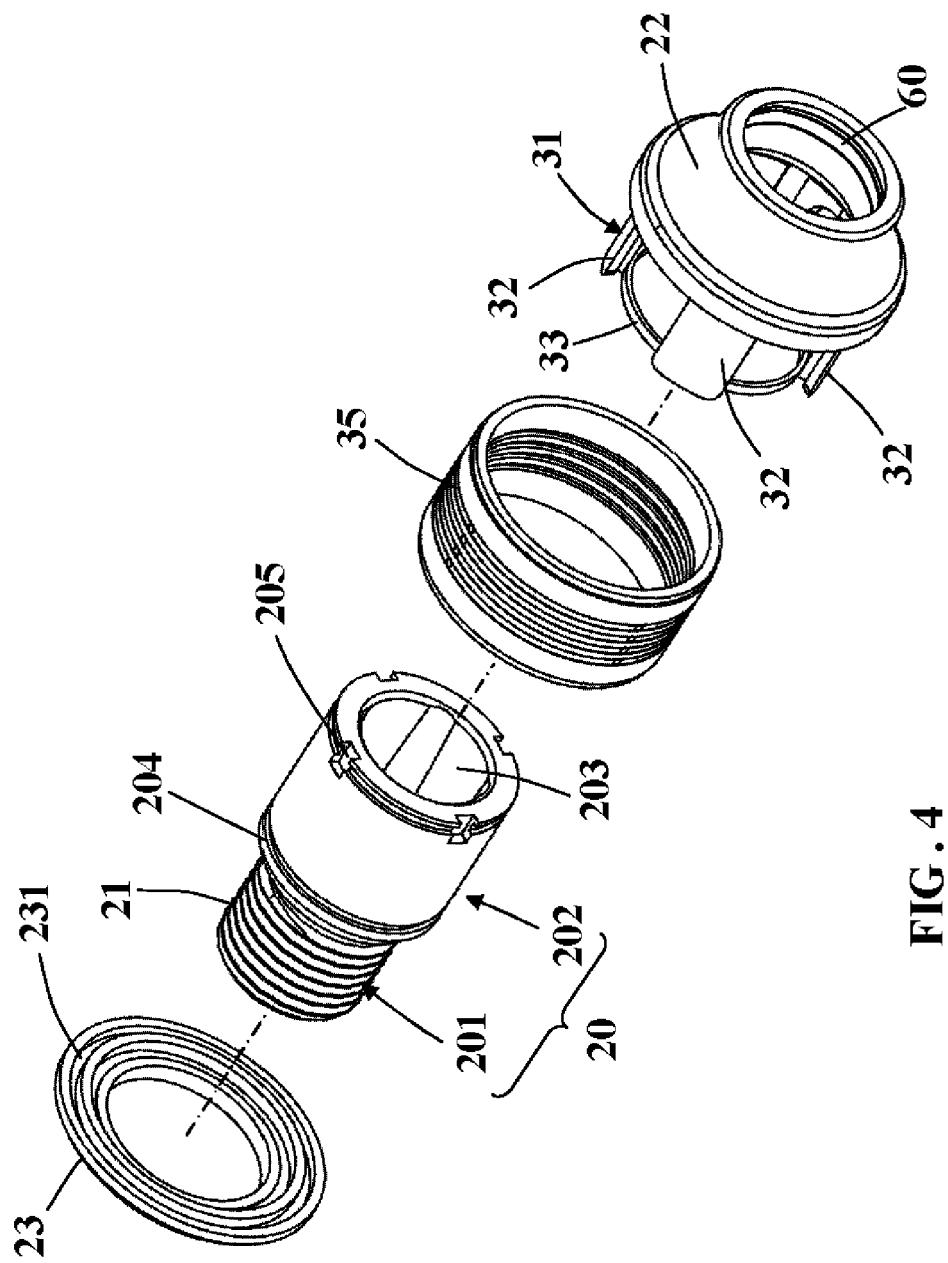
FIG. 4 is a cross-sectional view viewed from a first angle of the force sensing base, the strain touch member, the sensor, the ring housing, the ring cover, and the pedal shaft of the present invention.
Figure 5:
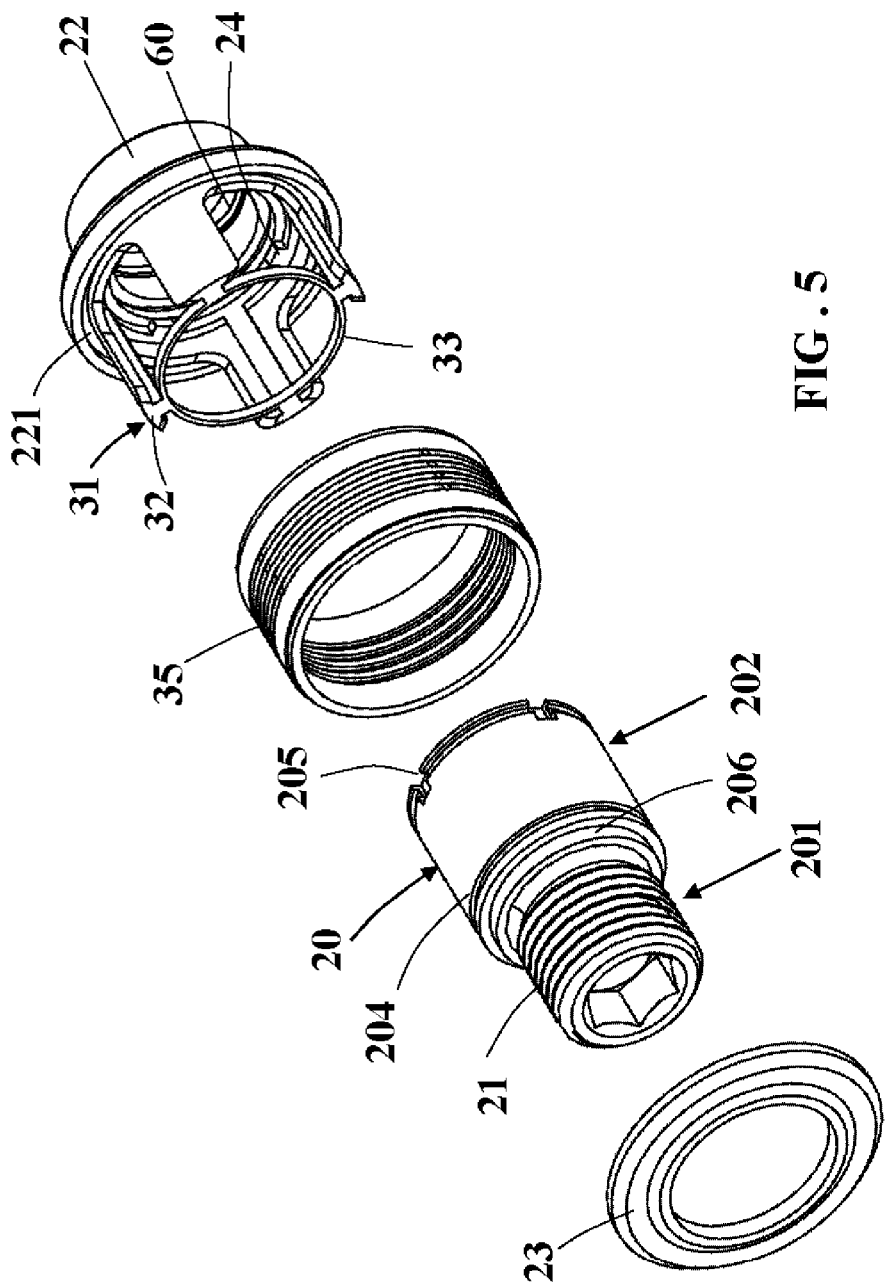
FIG. 5 is a cross-sectional view viewed from a second angle of the force sensing base, the strain touch member, the sensor, the ring housing, the ring cover, and the pedal shaft of the present invention.

Please refer to FIGS. 2, 4, and 5, the force sensing base 20 may include a connection portion 201 and a sensing portion 202 which are coaxially integrated with each other. The connection portion 201 is screwed with the screw structure 21 so as to fasten to the screw hole 12 of the crank 10. The sensing portion 202 has an axial connection groove 203. The axle end of the pedal shaft 14 is passing through the connection groove 203 and connected with the bolt 15 which is arranged at the axles of the connection portion 201 and the sensing portion 202. Therefore, the directing force which is exerted on the pedal shaft 14 may be exerted to the sensing portion 202 of the force sensing base 20 through the axle end 141 so that the strain force may be generated from the sensing portion 202.

Please refer to FIGS. 2, 4, and 5, the strain touch member 31 may include a plurality of strain touch elements 32 with plate and claw shape and a ring touch element 33 connected to one end of each strain touch element 32. The strain touch elements 32 are the structure with plate and claw shape, and are arranged parallel to the axle of the force sensing base 20. One end of each strain touch element 32 is connected to the ring housing 22, and the other end thereof is connected to the ring touch element 33. The ring housing 22 is fastened to at least one slot 205 of the sensing portion 202 through at least one snap 204. The ring touch element 33 is installed in a ring groove 204 arranged at the surface of the sensing portion 202. The strain touch elements 32 are arranged parallel to the axle of the force sensing base 20, evenly spaced apart from each other, and contacted with a surface of the sensing portion 202 of the force sensing base 20. The strain force generated from the sensing portion 202 may be entirely reacted on all of the strain touch elements 32. Besides, the ring housing 22 and the ring touch element 33 are respectively contacted with two ends of the sensing portion 202 and reacted the strain forces of two ends of the sensing portion 202 to transmit to the strain touch elements 32 so that the strain touch elements 32 may be entirely reacted the strain force of the sensing portion 202. Therefore, the ring housing 22 and the ring touch element 33 improve the response of the strain force of the strain touch elements 32.

The pressure is generated from each strain touch element 32 which responses the strain force of the force sensing base 20. The pressure is acted at the sensor 35 so that the pedaling force detecting message is obtained by the sensor 35. The sensor 35 with the ring structure may ensure to receive the strain force which is reacted from each strain touch element 32. And the strain forces are different directions and different magnitudes.

The ring cover 23 is assembled on a reducing diameter step 206 of the sensing portion 202 adjacent to the connection portion 201. A surface of the ring housing 22 faced to the ring cover 23 and a surface of the ring cover 23 faced to the ring housing 22 are respectively formed an embedding groove 221 and 231 with ring shape. Two ends of the ring structure of the sensor 35 are respectively embedded in the corresponding embedding groove 221 and 231.

Figure 6:
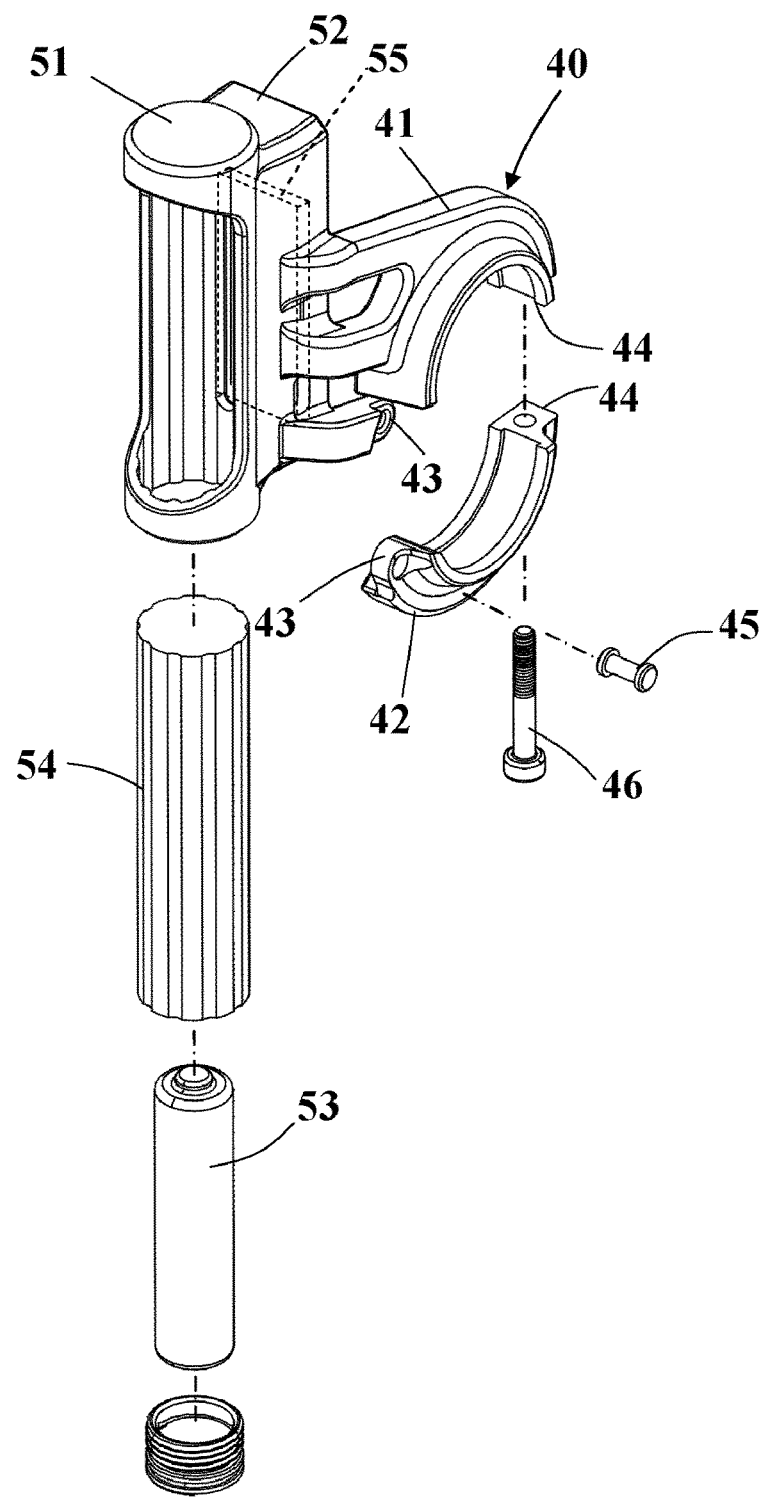
FIG. 6 is an exploded view of the ring outer base of the present invention.

Please refer to FIGS. 1, 2, and 6, the ring outer base 40 may include a half-ring upper base 41 and a half-ring lower base 42. The upper base 41 and the lower base 42 are connected with each other. The upper base 41 and the lower base 42 are respectively having a cross portion 43 and a facing portion 44. The cross portions 43 of the upper base 41 and the lower base 42 are connected and fastened to each other by an axial bolt 45. The facing portions 44 of the upper base 41 and the lower base 42 are connected and fastened to each other by a lock screw 46. The axial bolt 45 and the lock screw 46 make the upper base 41 and the lower base 42 generate an axial and a radial press force while coupling with each other and then the upper base 41 and the lower base 42 may be firmly positioned on the sensor 35 and between the ring housing 22 and the ring cover 23. The sensor 35 with the ring structure may be firmly positioned through the ring housing 22, the ring cover 23, and the ring outer base 40 to increase the accuracy of sensing.

In conclusion, the pedaling force pedaled by the rider through the pedal 13, the pedal shaft 14, the force sensing base 20, and the strain touch member 31 is transmitted to the sensor 35 so as to obtain the pedaling force detecting message. The message of the rotating speed is detected by the cadence sensor 60. The microprocessor assembly 55 receives the pedaling force detecting message and the message of the rotating speed and transfers to digital information to transmit to the cycling computer or the smart mobile device and calculate to specific data by software application for analyzing.

The vehicle-mounted detecting device is assembled to the connection of the crank 10 and the pedal 13 in a manner of external hanging. The pedal shaft 14, force sensing base 20, the ring housing 22, the ring cover 23, the strain touch member 31, the sensor 35, the ring outer base 40 are pre-assembled to an integrated device. The connection portion 201 of the force sensing base 20 may be screwed with the screw hole 12 of the crank 11 through the threading structure 21 so as to realize that the vehicle-mounted detecting device is mounted at the crank 11 and the pedal 13. Therefore, the operation of external hanging is simple and easy to perform to make sure firmly position and realize at any type of the crank and the pedal.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A vehicle-mounted detecting device for a bicycle, comprising:
    a force sensing base, screwed with a screw hole of a pedal end of a crank of the bicycle through a threading structure, and an axle end of a pedal shaft of a pedal of the bicycle is pivoted at a center of the force sensing base by a bolt;
    a strain touch member, contacted with and fastened at an outside of the force sensing base through a ring housing and for detecting a forced direction and a forced magnitude of the force sensing base, the strain touch member including a plurality of strain touch elements with plate and claw shape, one end of each strain touch element connected to the ring housing, the strain touch elements being arranged parallel to the axle of the force sensing base, evenly spaced apart from each other, and contacted with a surface of the sensing portion, the other end of each strain touch element opposite to the ring housing being connected with a ring touch element, the ring touch element installed in a ring groove arranged at the surface of the sensing portion;
    a sensor, contacted with the strain touch member, the sensor is a ring structure, the sensor is contacted with and fastened at the outside of the strain touch member through the ring housing and a ring cover fastened at the force sensing base, and a pedaling force exerted from a rider of the bicycle is transmitted to the sensor through the pedal shaft, the force sensing base, and the strain touch member, and then a pedaling force detecting message is obtained by the sensor; and
    a ring outer base, connected to and fastened at between the ring housing and the ring cover and covered the sensor, the ring outer base is connected to a battery base and a control box, a battery is replaceably installed in the battery base, a microprocessor assembly is arranged in the control box, the battery and the microprocessor are coupled with each other, and the pedaling force detecting message obtained by the sensor is received and processed by the microprocessor assembly and then transmitted to a smart mobile device.

2. The detecting device as claimed in claim 1, further comprises a cadence sensor, the cadence sensor is packaged in the ring housing, a message of a rotating speed of the pedal of the bicycle exerted by the rider is obtained by the cadence sensor and received and processed by the microprocessor assembly, and then the message of the rotating speed is transmitted to the smart mobile device.

3. The detecting device as claimed in claim 2, wherein the cadence sensor is a G-sensor, a tilted angle message of the bicycle is obtained by the G-sensor, and the tilted angle message is received and processed by the microprocessor assembly and then transmitted to the smart mobile device.

4. The detecting device as claimed in claim 1, wherein the force sensing base includes a connection portion and a sensing portion coaxially integrated with each other, the connection portion is screwed with the screw structure, the sensing portion has an axial connection groove, the axle end of the pedal shaft is passing through the connection groove and connected with the bolt arranged at the axles of the connection portion and the sensing portion.

5. The detecting device as claimed in claim 1, wherein the ring housing is fastened to at least one slot of the sensing portion through at least one snap, and the ring cover is assembled on a reducing diameter step of the sensing portion adjacent to the connection portion.

6. The detecting device as claimed in claim 1, wherein a surface of the ring housing faced to the ring cover and a surface of the ring cover faced to the ring housing are respectively formed an embedding groove, and two ends of the ring structure of the sensor are respectively embedded in the corresponding embedding groove.

7. The detecting device as claimed in claim 1, wherein the ring outer base includes a half-ring upper base and a half-ring lower base, the upper base and the lower base are connected with each other.

8. The detecting device as claimed in claim 7, wherein the upper base and the lower base are respectively having a cross portion and a facing portion, the cross portions of the upper base and the lower base are connected and fastened to each other by an axial bolt, and the facing portions of the upper base and the lower base are connected and fastened to each other by a lock screw.

* * * * *